United States Patent [19]

Stokes et al.

[11] 4,215,273
[45] Jul. 29, 1980

[54] MULTISPECTRAL SCANNER OPTICAL SYSTEM

[76] Inventors: Robert A. Frosch, Administrator of the National Aeronautics and Space Administration, with respect to an invention of Roy C. Stokes, Alvin; Norman G. Koch, Houston, both of Tex.

[21] Appl. No.: 25,163

[22] Filed: Mar. 29, 1979

[51] Int. Cl.² .............................................. G01J 1/00
[52] U.S. Cl. .................................... 250/347; 250/352; 250/353; 350/55; 356/72
[58] Field of Search ............... 250/332, 334, 347, 349, 250/353; 350/55; 356/72

[56] References Cited

U.S. PATENT DOCUMENTS

| 2,895,049 | 7/1959 | Astheimer et al. | 250/334 |
| 3,674,334 | 7/1972 | Offner | 350/55 |
| 3,927,254 | 12/1975 | Lessman | 350/55 |
| 3,963,328 | 6/1976 | Abel | 350/55 |
| 3,974,383 | 8/1976 | Chapman | 250/347 |
| 4,087,689 | 5/1978 | Asawa | 250/347 |

Primary Examiner—Davis L. Willis
Attorney, Agent, or Firm—Edward K. Fein; John R. Manning; Marvin F. Matthews

[57] ABSTRACT

Disclosed is an optical system for use in a multispectral scanner of the type used in video imaging devices. Electromagnetic radiation reflected by a rotating scan mirror is focused by a concave primary telescope mirror and collimated by a second concave mirror. The collimated beam is split by a dichroic filter which transmits radiant energy in the infrared spectrum and reflects visible and near infrared energy. The long wavelength beam is filtered and focused on an infrared detector positioned in a cryogenic environment. The short wavelength beam is dispersed by a pair of prisms, then projected on an array of detectors also mounted in a cryogenic environment and oriented at an angle relative to the optical path of the dispersed short wavelength beam.

28 Claims, 4 Drawing Figures

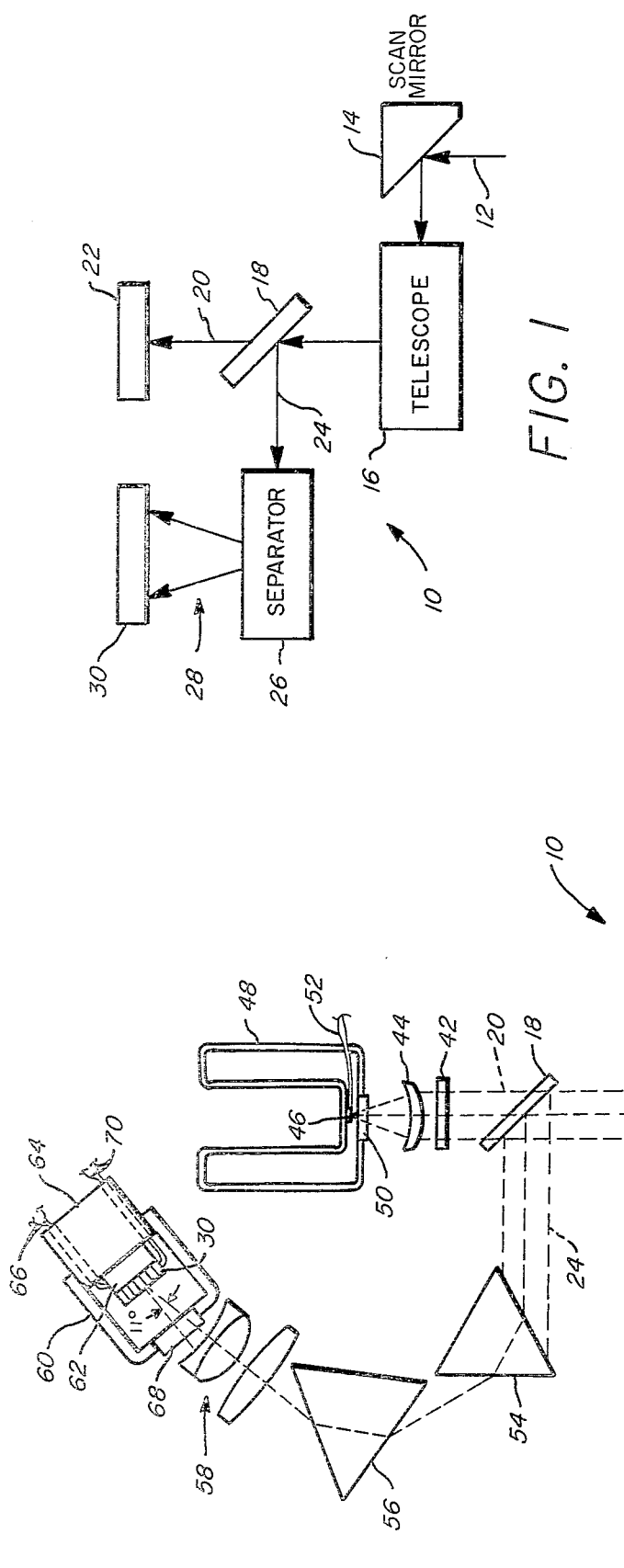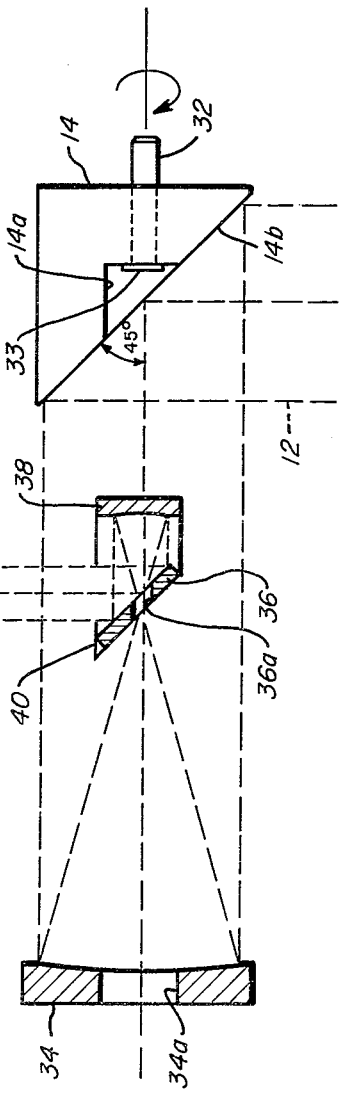
FIG. 1
FIG. 2

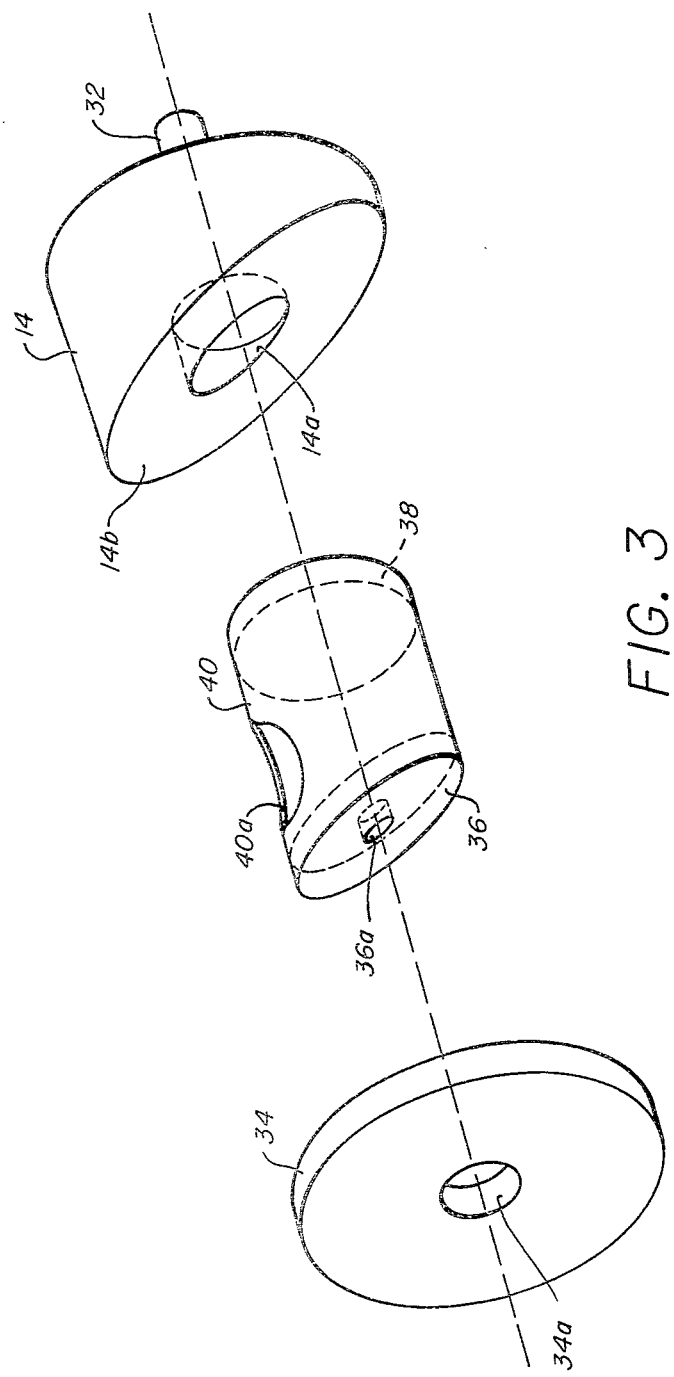
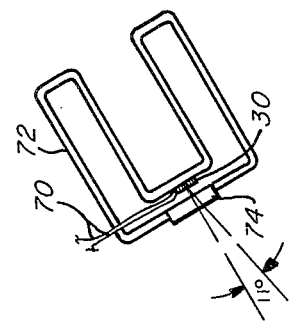

MULTISPECTRAL SCANNER OPTICAL SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The present invention pertains to optical systems for processing electromagnetic radiation. More particularly, the present invention relates to apparatus for separating a broad band beam of visible and infrared radiation so as to distinguish relatively narrow band segments of the beam for presentation to individual detectors operable within the corresponding narrow band regions. Such an optical system finds particular application in broad band optical scanning systems for use in video imaging systems.

2. Description of the Prior Art

Multispectral scanners for use with mechanical video systems are known and used, for example, in constructing pictures of ground terrain from a moving airplane. The operation of such a scanner combines with the forward motion of the plane to provide a sequence of views of the terrain passing below. An optical device as part of the scanner sweeps repeatedly in a direction perpendicular to the flight of the plane to gather electromagnetic radiation from the terrain along a range of directions in sequence. Such a sweeping optical device may be a rotating scan mirror which reflects the light gathered from below onto an optical system which, in turn, presents the gathered light to one or more electromagnetic radiation detectors. Thus, by use of the detectors and appropriate electronics, an image of the terrain may be reconstructed in much the same way a television image is constructed using a raster composed of horizontal sweeps of information-laden signals, with each successive horizontal sweep displaced laterally from the previous horizontal sweep. In such a mechanical scanner, the flight of the plane provides the analagous vertical displacement while the rotation of the scan mirror is used to construct the horizontal sweeps. The rate of the scan mirror rotation is proportional to the altitude of the plane as well as the speed of the plane. In a typical operation, such a scan mirror may rotate at a rotational speed ranging from, say, 600 rpm to 6,000 rpm.

The optical systems of such multispectral scanners should provide proper filtering to achieve well-defined wavelength limits of the band or bands of electromagnetic radiation desired to be detected. In practice, such wavelengths may range throughout the visible portion of the electromagnetic spectrum as well as the infrared spectrum. Due to the varied transmission properties of optical devices in these wavelength regions, and the general dependency of detectors on the wavelength of the radiation being detected, the radiation may be separated within the optical system of the multispectral scanner and various wavelength portions of the radiation presented to appropriate detectors. Consequently, known multispectral scanners have generally included large, relatively inefficient optical systems, or have been quite limited in the spectral ranges which they could effectively detect. Where relatively long focal length optics are employed, large image sizes in the optical systems of the scanners require detectors with relatively large sensing areas. Generally, background noise hampering the operation of such detectors is larger where such sensing areas are increased.

To reduce chromatic aberration as well as to minimize absorption losses, reflective gratings have been utilized to provide the necessary distinction among wavelength regions of the bands being detected. However, as is well known, the efficiency of such gratings varies with the wavelength distinguished. Consequently, a relatively flat frequency response is not available over a wide wavelength band using such a grating.

U.S. Pat. No. 2,895,049 discloses a camera operable in the infrared region of the spectrum.

U.S. Pat. No. 3,674,334 discloses a three-mirror optical system designed to provide high magnification in a relatively compact system. U.S. Pat. No. 3,927,254 discloses an optical system and scanning device including rotating dihedral and trihedral reflectors as well as multiple dichroic filters. U.S. Pat. No. 3,963,328 discloses a wide angle reflective optical system to provide corrections for spherical aberration, coma, and astigmatism by use of reflective elements only.

SUMMARY OF THE INVENTION

The present invention employs a relatively short focal length telescope including a primary paraboloidal reflector separated from a collimating reflector by a field stop. The field stop, which is situated at the focal point of the primary reflector is provided by a folding mirror featuring an aperture. Output from the telescope is a collimated beam including all wavelengths to be detected. A rotating scan mirror is centered on, and has its axis of rotation coincidental with, the optic axis of the telescope, and is always oriented at the angle of 45° relative to the optic axis.

The output beam from the telescope is separated into long and short wavelength segments by a dichroic filter. The bandwidth of the long wavelength segment is further defined by an interference filter before the long wavelength beam is focused on an infrared detector. The short wavelength portion of the beam separated by the dichroic filter is dispersed by a two-prism spectrometer utilizing sapphire prisms of high index of refraction. The separated short wavelength beam is then focused on an array of short wavelength detectors.

The short wavelength detector array may include a plurality of detectors with each detector operable in a relatively narrow wavelength band. With a sufficient number of detectors appropriately chosen and operated, detection of electromagnetic radiation may be generally continuous along the entire selected short wavelength band. However, in each narrow short wavelength band, the optimum detector for sensing in that band may be used. Furthermore, with the electromagnetic radiation being sensed by individual detectors operating in different bands, the processing of radiation detection data from the detectors may be selectively effected according to the individual wavelength bands.

The short wavelength detectors are arranged in sequence according to the wavelength band detected, and positioned so that the shortest wavelength detector is closest to the focusing lens. This detector arrangement compensates for chromatic aberration introduced by the refracting optics.

Since all of the detectors may be electrical devices, both the long wavelength detector and the short wavelength detector array may each be maintained in a cryogenic environment to reduce noise.

BRIEF DESCRIPTION OF THE DRAWINGS

FIG. 1 is a schematic diagram of the major components of a multispectral scanner optical system employing the present invention;

FIG. 2 is a schematic illustration showing details of the optical system of the present invention;

FIG. 3 is a perspective view showing the arrangement of the optical elements of the telescope portion of the system in relation to the scanning mirror; and FIG. 4 is a schematic illustration of a detail of an optical system showing an alternate method of cooling the short wavelength detector array.

DESCRIPTION OF PREFERRED EMBODIMENTS

A multispectral scanner incorporating an optical system according to the present invention is shown generally at 10 in FIG. 1. Electromagnetic radiation 12 incident on the scanner is reflected by a scan mirror 14 to a telescope 16 which concentrates the incident light into a collimated beam of reduced cross section. Output from the telescope 16 is incident on a beam splitting device 18. The beam splitter 18 segregates the electromagnetic radiation into a relatively long wavelength portion as distinguished from a relatively short wavelength portion. The long wavelength radiation 20 is then sensed by means of an appropriate detector 22 operating in the corresponding wavelength range. The short wavelength portion of the radiation 24 is further segregated according to wavelength by separating apparatus 26. The dispersed short wavelength radiation 28 is then incident on an array of detectors 30 operating in a sequence of relatively narrow wavelength bands which generally combine to include the spectral range of the short wavelength radiation 24.

The scanner with optical system shown at 10 in FIG. 1 is illustrated in detail in FIG. 2, with further details shown in FIG. 3. The scan mirror 14 is cut from a solid cylindrical piece of metal, such as aluminum, which may be polished to a high fidelity reflecting surface.

The aluminum cylinder is cut in truncated fashion along a plane oriented at 45° relative to the axis of the cylinder. A shaft 32 is mounted in an appropriate bore drilled along the axis of the aluminum cylinder. A counterbore 14a passes through the truncated face of the cylinder 14 to provide a recess wherein a rivet or nut 33 is used to anchor the exposed end of the shaft 32. The remaining surface 14b of the truncated face of the cylinder is polished to provide a reflecting surface. Thus, the reflecting mirror surface is elliptical in shape, with an elliptical aperture centered in the surface and having its major axis coincidental with that of the elliptical outer border of the surface.

As described in more detail hereinafter, the scan mirror 14 is made to rotate about its axis during operation of the multispectral scanner. For electromagnetic radiation incident on the mirror surface 14b in a plane perpendicular to the axis of rotation, as indicated by 12 in FIGS. 1 and 2, the reflected radiation is directed parallel to the axis of rotation, and toward a primary telescope mirror 34 (FIGS. 2 and 3).

The primary mirror 34 is a front surface, concave, paraboloid mirror of relatively short focal length with a central aperture 34a. The aperture 34a may be utilized in alignment procedures.

A flat folding mirror 36 featuring an aperture 36a serves as a field stop positioned at the point of focus for parallel radiation incident on the primary mirror 34. A front surface collimating mirror 38 faces the primary mirror 34 and is positioned a short distance on the opposite side of the folding mirror 36. The folding mirror 36 is also a front surface mirror with its reflecting side facing the collimating mirror 38. The collimating mirror 38 is positioned relative to the focal point of the primary mirror 34 so as to provide a collimated output beam of reduced transverse cross section compared to the transverse dimension of the beam incident on the primary mirror. The collimating mirror 38 and the folding mirror 36 are centered and aligned relative to the optic axis of the primary mirror 34. This telescope optic axis is generally coincidental with the axes of the scan mirror 14 and the shaft 32.

The folding mirror 36 is oriented at an angle, such as 45° as illustrated in FIGS. 1-3, relative to the telescope optic axis. Thus, with the reflecting front surface of the folding mirror 36 facing the collimating mirror 38, the collimated radiation beam is directed out of the telescope perpendicular to the optic axis of the telescope.

The collimating and folding mirrors 38 and 36, respectively, are positioned within a light baffle 40 to prevent radiation incident on the scan mirror 14 at random angles relative to the beam 12 from being reflected directly onto the folding mirror. The baffle 40 includes an appropriate aperture 40a for the exit of the collimated output beam from the telescope.

A dichroic filter serves as the beam splitter 18 to divide the collimated output beam from the telescope according to the wavelength of the radiation in a well known manner. With the dichroic filter oriented at an angle of 45° relative to the optic path of the beam incident thereon, the longer wavelength portion of the beam 20 is transmitted by the dichroic filter 18 while the shorter wavelength portion of the beam 24 is reflected by the dichroic filter at a 90° angle relative to the direction of the incident beam. To accommodate long wavelength radiation in the infrared region of the spectrum, the dichroic filter 18 may be constructed using germanium which is relatively transparent over a significant portion of that region of the spectrum. In particular, such a dichroic filter 18 may be constructed to reflect energy in a wavelength band, for example, extending from 0.4 to 4 $\mu$m while transmitting a band of radiation from 6 to 14 $\mu$m.

The transmitted infrared beam 20 may be further selectively defined by use of an interference filter 42. Such a filter may be constructed to operate in the infrared region by using a germanium substrate with appropriate reflecting coatings. By operating on a collimated beam with the interference filter 42 as shown rather than a converging beam as is the usual case, the band limits of the radiation transmitted by the filter 42 may be well-defined and very accurately controlled. For example, the infrared beam may be narrowed by the filter 42 to a bandwidth from 10.4 to 12.5 $\mu$m.

The collimated output from the interference filter 42 is focused by a germanium lens 44 on an infrared detector 46. The long wavelength detector 46 may be of the tri-metal photoconductive type. For example, a mercury-cadmium-telluride detector may be used. To reduce the noise to which such long wavelength detectors may be subject, the detector 46 is positioned within the vacuum chamber of a dewar 48 and in thermal contact with its interior cold wall. Thus, the detector 46 may be cooled to liquid nitrogen temperature, for example, for relatively noise-free operation. A germanium window 50 is provided in the base of the dewar 40 to transmit the infrared beam which is focused on the detector 46 by the lens 44. Wires 52 pass through the wall of the dewar 48 to provide appropriate electrical leads to connect the detector 46 to power and monitoring equipment (not shown) which is well known.

The separator 26 (FIG. 1) comprises a double prism spectrometer.

The short wavelength beam 24 reflected by the dichroic filter 18 is incident on a prism 54 which may be oriented, for example, at the angle of minimum deviation for the central wavelength of the short wavelength band. The dispersion of the short wavelength band provided by the prism 54 is amplified by a second prism 56, again oriented at the minimum deviation angle of, say, the mid-wavelength of the band, thereby providing substantial separation of the short wavelength beam over the visible and near infrared portions of the spectrum. The dispersion of the short wavelength band is further enhanced by employing sapphire prisms 54 and 56, such material having a relatively high index of refraction to increase the dispersive effect of each prism.

The short wavelength beam dispersed by the double prism spectrometer is focused by a triplet compound lens shown generally at 58 constructed of glass with good transmission properties in the visible and near infrared regions of the spectrum. The array of short wavelength detectors 30 is positioned at the focal point of the lens 58 within a vacuum chamber 60. A thermoelectric cooler element 62 is mounted on a base 64 of the vacuum chamber 60, and operated by means of wires 66 passing through the chamber base and sealed thereto for vacuum purposes. Such a thermoelectric cooler may, for example, include a four stage thermocouple cooler operated by forcing current therethrough to cool the thermocouple elements in a well known manner. The detector array 30 is mounted in thermal contact with the thermoelectric cooler element 62, and may thus be selectively cooled by operation of the thermoelectric cooler.

A window 68 constructed of sapphire closes the vacuum chamber 60 to provide transmission of the focused beam of visible and near infrared radiation from the lens at 58 to the detector array 30. Wire leads 70 pass through and are sealed to the vacuum chamber base 64 to connect the detector array 30 to power and monitoring equipment (not shown). Thus, for purposes of reduced noise operation, the short wavelength detector array 30 may be operated at cryogenic temperatures by operation of the thermoelectric cooler 62.

To provide sufficient breadth of wavelength detection to detect the entire short wavelength portion of the beam, the detector array 30 includes a plurality of detectors, operating generally in different wavelength regions. These detectors may be photodiodes constructed of material to operate in different wavelength regions. For example, a sequence of four silicone detectors may be utilized to sense radiation in regions at the shortest wavelength end of the short wavelength beam, followed by two germanium detectors and one indium arsenide detector operating at the longest wavelength end of the beam. With such an array of seven detectors, a short wavelength beam extending from approximately 0.45 to 2.35 μm may be detected.

FIG. 4 illustrates an alternate method of cooling the short wavelength detector array 30. The short wavelength beam is focused by the lens 58 (FIG. 2) on the detector array 30 which is positioned within the vacuum chamber of a second dewar 72. A window 74 constructed of sapphire with good transmission properties in the visible and near infrared regions of the spectrum closes the bottom of the dewar 72 to provide transmission of the focused beam to the detector array 30, which is held in thermal contact with the interior cold wall of the dewar. The wire leads 70 pass through the wall of the dewar 72 to the power and monitoring equipment (not shown). Thus, reduced noise operation of the short wavelength detector array 30 at cryogenic temperature may be achieved by cooling the detector array with liquid coolants.

The triplet focusing lens at 58 is particularly designed to focus the radiation over a small area, and thereby provide high fidelity image quality over a wide wavelength band. However, with such a lens system, some chromatic abberation may be anticipated. The short wavelength detectors are therefor arranged in the array 30 in sequence according to the wavelength region in which each is to sense radiation. Then, the detector array 30 is tilted relative to the optic axis of the compound lens 58 to maximize the focusing of the radiation contained in the short wavelength beam so that the radiation of a given wavelength will be focused primarily on the detector within the array 30 operable to detect radiation of that particular wavelength. Thus, detectors within the array 30 operable in the longest wavelength regions are positioned farthest from the triplet lens at 58.

In particular, the vacuum chamber 60 (FIG. 2) is positioned so that the detector array 30 is oriented, as shown, at an angle of 11° relative to the optic axis of the compound lens 58. Similarly, in the case of the apparatus shown in FIG. 4, the dewar 72 is oriented to maintain the detector array 30 tilted at an angle of 11° relative to the optic axis of the lens 58.

In operation, the infrared radiation detector 46 is cooled to the desired low temperature by applying a liquid coolant to the dewar 48. The thermoelectric cooling element 62 is operated to cool the short wavelength detector array 30. Alternatively, with the cooling arrangement shown in FIG. 4, a liquid coolant is applied to the dewar 72 to lower the temperature of the detector array 30. The detectors 30 and 46 are then made operational by use of the appropriate power and monitoring equipment.

As the scanner system at 10 is moved over the object or terrain to be viewed, the scan mirror 14 is made to rotate continuously about the optic axis of the telescope by operation of a motor (not shown) to which the shaft 32 is linked. With the reflecting surface 14b oriented at an angle of 45° relative to the optic axis of the telescope, radiation incident on the surface 14b along directions normal to the telescope optic axis will be reflected along that axis as the rotating mirror 14 is caused to sweep through an arc exposing the reflecting surface 14b to such radiation. In this way, electromagnetic radiation proceeding toward the scanner system from the object is gathered by the rotating reflecting surface 14b from a range of directions and reflected toward the telescope mirror 34.

It will be appreciated that the reflecting surface 14b may be shielded from radiation proceeding from directions other than from the object or terrain being viewed. This may be accomplished by placing a hood or other light-stop device over the scan mirror 14 so as to define an aperture through which radiation intended to be detected may proceed toward the mirror 14. In practice, such an aperture may limit the radiation gathering range of the reflecting surface 14b to an arc of, say, 100° to 120°.

The present invention provides a more compact optical system to analyze a broader spectrum than is known from previously available systems. By separating the long wavelength radiation from the short wavelength bands, the long wavelength radiation detector 46 may be isolated from the short wavelength detector array at 30, and maintained in its own peculiar cryogenic environment. Furthermore, by processing the infrared radiation separately from the visible and near infrared radiation, the latter may be processed by use of optical devices, such as the sapphire prisms 54 and 56, which are not sufficiently transparent in the infrared region but which are advantageous for the shorter wavelength regions. The use of sapphire prisms in the short wavelength spectrum spectrometer provides an optical device of high index of refraction and good transmission over the desired short wavelength spectrum. Also, such a sapphire prism spectrometer provides relatively wide dispersion of the radiation as opposed to a grating, whose efficiency varies with the wavelength and whose use is, therefore, usually limited to processing a relatively narrow band of radiation.

The short wavelength detector array 30 is tilted relative to the optic axis of the compound lens 58 as described hereinbefore to compensate for possible chromatic aberration resulting from such a lens design. The resulting varied displacement of the several detectors in the array 30 relative to the lens 58 enhances focusing of an image at each detector in the array of radiation within the spectral band to be sensed by the respective detector. Therefore, the spectral coverage and band limits for each detector in the array 30 is determined not only by the frequency response of the detector but also by its size and location in the array 30.

By filtering the infrared radiation with the bandpass filter 42 acting on the radiation in collimated beam form, the band limits for the long wavelength band can be accurately controlled, as opposed to the relatively inaccurate band definition that results where a converging beam is filtered. In the latter case, the band limits are generally increased beyond those intended to be defined. Similarly, the operation of the dichroic filter 18 on a collimated beam provides enhanced frequency response to separate the incident beam according to wavelength as compared to the operation of such a filter on a converging beam.

Collimation of the radiation to be detected is effected prior to the separation of the radiation according to wavelength. Consequently, only one collimating mirror is used. Further, within the telescope of the optical system, all optical devices are reflective to reduce chromatic aberration. The particular type of telescope utilized, including, for example, the primary concave mirror 34, the concave collimating mirror 38, and the folding mirror 36, may be constructed with a relative short effective focal length. Thus, the sizes of the optical components which thereafter operate on the radiation may also be reduced. For example, in a typical optical system constructed according to the present invention, the effective focal length of the short wavelength portion of the system may be approximately 25.4 cm, while the long wavelength portion of the system may have an effective focal length of approximately 18.3 cm. The short focal length of the system reduces the focused image sizes and, therefore, the size of the detectors required as well. Use of smaller detectors reduces the system noise, such detector noise being generally proportional to the sensing area of the detector.

The present invention provides an optical system that is compact, but may be utilized to detect electromagnetic radiation over a broad spectral range. Further, the optical devices used in the system according to the present invention are efficient in processing the electromagnetic radiation gathered by the scan mirror for detection.

The foregoing disclosure and description of the invention is illustrative and explanatory thereof, and various changes in the size, shape and materials as well as the details of the illustrated construction may be made within the scope of the appended claims without departing from the spirit of the invention.

I claim:

1. Apparatus for processing electromagnetic radiation comprising:
   (a) telescope means for receiving such electromagnetic radiation and for concentrating said electromagnetic radiation in a collimated beam;
   (b) beam splitting means for dividing said collimated beam into a collimated long wavelength band beam and a collimated short wavelength band beam; and
   (c) dispersion means for dispersing said short wavelength band beam.

2. Apparatus as defined in claim 1 wherein said dispersion means comprises prism spectrometer means including first prism means for receiving and dispersing said short wavelength band beam, and second prism means for receiving and further dispersing the dispersed output radiation from said first prism means.

3. Apparatus as defined in claim 2 wherein said first prism means comprises a sapphire prism, and said second prism means comprises a sapphire prism.

4. Apparatus as defined in claim 2 or, in the alternative, as defined in claim 1 wherein said telescope means comprises:
   (a) first concave mirror means for receiving electromagnetic radiation to be processed;
   (b) second concave mirror means for receiving and collimating electromagnetic radiation reflected by said first concave mirror means;
   (c) folding mirror means for reflecting said collimated electromagnetic radiation beam; and
   (d) field stop means at the focal point of said first concave mirror means.

5. Apparatus as defined in claim 4 further comprising bandpass filter means for selectively defining the wavelength limits of said collimated long wavelength band beam.

6. Apparatus as defined in claim 5 further comprising long wavelength radiation detection means.

7. Apparatus as defined in claim 6 further comprising lens means for focusing said filtered long wavelength band beam on said long wavelength radiation detection means.

8. Apparatus as defined in claim 7 wherein said long wavelength radiation detection means comprises photoconductive means.

9. Apparatus as defined in claim 4 further comprising short wavelength radiation detection means.

10. Apparatus as defined in claim 9 further comprising compound lens means for focusing said dispersed short wavelength band beam on said short wavelength radiation detection means.

11. Apparatus as defined in claim 10 wherein said short wavelength radiation detection means comprises an array of photodiode detectors such that each photodiode detector is operable to sense radiation in a wavelength band at least partially included within the band limits of said dispersed short wavelength band beam.

12. Apparatus as defined in claim 11 wherein said array of photodiode detectors is oriented relative to the optic axis of said compound lens means to optimize the focusing of each said short wavelength band beam portion to be sensed by a particular detector in said array of photodiode detectors at said detector.

13. Apparatus as defined in claim 1 wherein said beam splitting means comprises dichroic filter means.

14. A multispectral scanner optical system comprising:
    (a) scanning means for gathering electromagnetic radiation to be detected;
    (b) reflective telescope means for receiving such radiation gathered by said scanning means and collimating said radiation into a beam;
    (c) beam splitting means for receiving and separating said collimated beam into a long wavelength band collimated radiation beam and a short wavelength band collimated radiation beam;
    (d) prism spectrometer means for dispersing said short wavelength band collimated radiation beam;
    (e) a plurality of short wavelength band radiation detectors wherein each such detector is operable for sensing radiation of wavelength over a corresponding detection band at least a portion of which band is included within the wavelength limits of the dispersed short wavelength radiation band; and
    (f) long wavelength band radiation detector means operable for sensing radiation of wavelength over a band at least a portion of which band is included within the wavelength limits of the long wavelength radiation band.

15. A system as defined in claim 14 further comprising bandpass filter means for receiving and defining wavelength limits of said long wavelength band collimated radiation beam.

16. A system as defined in claim 15 further comprising lens means for receiving the long wavelength band collimated output beam from said bandpass filter means and focusing said output at said long wavelength band radiation detector means.

17. A system as defined in claim 14 wherein said prism spectrometer means comprises sapphire prism means.

18. A system as defined in claim 17 wherein said prism spectrometer means comprises a first sapphire prism for receiving and dispersing said short wavelength band collimated radiation beam, and a second sapphire prism for receiving and further dispersing the dispersed output radiation from said first sapphire prism.

19. A system as defined in claim 14 further comprising compound lens means for focusing said dispersed short wavelength band radiation at said short wavelength band radiation detectors.

20. A system as defined in claim 19 wherein said short wavelength band radiation detectors are each positioned relative to said compound lens means to optimize the focusing at each such detector of that spectral portion of said dispersed short wavelength band radiation which the respective detector is to sense.

21. A system as defined in claim 14 wherein said long wavelength band radiation detector means comprises photoconductive means.

22. A system as defined in claim 14 wherein each said short wavelength band radiation detector comprises photodiode means.

23. A system as defined in claim 14 wherein said beam splitting means comprises dichroic filter means.

24. A system as defined in claim 14 further comprising cooling means for selectively cooling said long wavelength band radiation detector means.

25. A system as defined in claim 14 further comprising cooling means for selectively cooling at least one of said short wavelength band radiation detectors.

26. A system as defined in claim 25 wherein said cooling means comprises thermoelectric cooling means.

27. A system as defined in claim 14 wherein said telescope means comprises concave primary mirror means for receiving electromagnetic radiation gathered by said scanning means, concave collimating mirror means for receiving and collimating in a beam said gathered radiation reflected by said primary mirror means, and folding mirror means for reflecting said collimated beam generally toward said beam splitting means.

28. A system as defined in claim 27 wherein said folding mirror means is positioned between said primary mirror means and said collimating mirror means, and includes an aperture through which the radiation reflected by said primary mirror means passes toward said collimating mirror means.

* * * * *